Patented Mar. 25, 1930

1,751,933

UNITED STATES PATENT OFFICE

FELIX LINDNER AND FRIELRICH LINK, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF HYDROCYANIC ACID

No Drawing. Application filed October 18, 1927, Serial No. 227,051, and in Germany October 30, 1926.

We have found that the production of hydrocyanic acid from ammonia and carbon monoxide can be carried out with excellent results by the employment as catalysts, of carbides of a metal of the iron group, particularly iron carbide, either alone or in association with other catalysts such as those specified below, by which the efficiency of the said catalysts is still further improved; particularly suitable for this purpose is the addition of at least one of the elements molybdenum, manganese, tungsten, cerium, titanium or copper, either in a free or combined state.

The operation can be conducted at temperatures even below 600° centigrade, for example at 450° centigrade, so that, in operating in circulation, the ammonia employed can be converted into hydrocyanic acid without practically any loss.

The heating may be effected internally or externally, in any suitable or known manner.

The following example further illustrates the nature of this invention which however is not restricted thereto.

*Example*

A mixture of carbon monoxide and ammonia, containing 10 to 12 per cent of the latter, is passed at 450° centigrade over a catalyst composed of iron carbide and modybdenum. In a single passage of the gaseous mixture, a considerable proportion of the ammonia employed is converted, without undergoing decomposition into its elements into hydrocyanic acid. After the hydrocyanic acid has been removed, whether in the form of ammonium cyanide by cooling or as an alkali metal cyanide by absorption in caustic alkali solution, the remainder of the gas is returned to the process in any known or suitable manner.

What we claim is:

1. The process of producing hydrocyanic acid, which comprises bringing ammonia and carbon monoxide into interaction in contact with iron carbide.

2. A modification of the process of claim 1, which comprises employing as a catalyst iron carbide in association with at least one component selected from the class consisting of molybdenum and tungsten, and their compounds.

3. The process of producing hydrocyanic acid which comprises passing a mixture of carbon monoxide and ammonia over a catalyst comprising iron carbide and molybdenum at a temperature of about 450° C.

In testimony whereof we have hereunto set our hands.

FELIX LINDNER.
FRIEDRICH LINK.